United States Patent [19]

Stashko

[11] Patent Number: 4,880,338
[45] Date of Patent: Nov. 14, 1989

[54] CUTTING INSERT

[75] Inventor: Daniel R. Stashko, Holly, Mich.

[73] Assignee: GTE Valenite Corporation, Troy, Mich.

[21] Appl. No.: 281,437

[22] Filed: Dec. 7, 1988

[51] Int. Cl.$^4$ ............................................ B23B 27/22
[52] U.S. Cl. .................................................. 407/114
[58] Field of Search ................. 407/113, 114, 115, 116

[56] References Cited

U.S. PATENT DOCUMENTS

| | | | |
|---|---|---|---|
| 3,395,434 | 8/1968 | Wirfelt | 29/95 |
| 3,815,191 | 6/1974 | Holma | 29/95 R |
| 3,815,192 | 6/1974 | Ohtsu et al. | 29/95 R |
| 3,947,937 | 4/1976 | Hertel | 29/95 R |
| 4,035,888 | 7/1977 | Romagnolo | 29/95 R |
| 4,214,845 | 7/1980 | Mori | 407/114 |
| 4,214,847 | 7/1980 | Kraemer | 407/114 |
| 4,215,957 | 8/1980 | Holma et al. | 407/114 |
| 4,247,232 | 1/1981 | McCreery et al. | 407/114 |
| 4,273,480 | 6/1981 | Shirai et al. | 407/114 |
| 4,335,984 | 6/1982 | Zweekly | 407/114 |
| 4,447,175 | 5/1984 | Warren | 407/114 |
| 4,479,744 | 10/1984 | Stricker | 407/114 |
| 4,626,140 | 12/1985 | Zweekly et al. | 407/114 |
| 4,626,141 | 12/1986 | Malaker et al. | 407/114 |
| 4,710,069 | 12/1987 | Loqvist | 407/114 |

Primary Examiner—Frederick R. Schmidt
Assistant Examiner—Blynn Shideler
Attorney, Agent, or Firm—David J. Koris

[57] ABSTRACT

A disposable cutting insert for chip forming which provides first chip forming surfaces in the form of depressions and second chip forming surfaces also in the form of depressions such that if a respective chip is not curled and broken along a first chip forming surface, a second surface will effect such a result.

11 Claims, 4 Drawing Sheets

CUTTING INSERT

BACKGROUND OF THE INVENTION

1. Field of the Invention

The present invention relates to a disposable cutting insert, particularly to a cutting insert such as is adapted for being detachably mounted on a tool holder and for cutting a work piece. Cutting inserts of the present invention are generally made of a cemented metal carbide such as tungsten carbide and are formed by pressing techniques after which the pressed articles are sintered. The present invention particularly relates to such disposable cutting inserts for chip forming.

2. Description of Prior Art

In present day cutting operations such as in turning, facing, boring and contouring applications, the forming and breaking of the chip is an important consideration. In those operations utilizing disposable cutting inserts which have been formed by pressing and sintering it is known to provide chip forming configurations which are molded into a face of the insert. Various specific configurations are known including cutting inserts having grooves, dimples, depressions and the like.

The patent to Malaker et al, U.S. Pat. No. 4,626,141, is illustrative of a chip control insert embodying a chip control groove. The patent to Ohtsu et al, U.S. Pat. No. 3,815,192, is illustrative of a chip control insert embodying chip control dimples. The present invention relates to disposable cutting inserts for chip forming wherein a plurality of depressions have been molded into a top face thereof. Illustrative of this type of cutting insert are the inserts described in U.S. Pat. No. 4,215,957 to Holma et al; U.S. Pat. No. 4,273,480 to Shirai et al; U.S. Pat. No. 4,447,175 to Warren; and, U.S. Pat. No. 4,710,069 to Loqvist.

In the patent to Shirai et al, cutting inserts are provided having a plurality of intersecting recesses. Although such inserts may be useful in reducing friction and heat during use, such inserts do not provide adequate means to force the chips to curl and break as is desired during the cutting operation.

Warren and Loqvist provide for cutting inserts having spaced recesses which like Shirai et al are useful in reducing friction and heat during use. However, also like Shirai et al, the inserts of Warren and Loqvist do not provide adequate structure to cause the chips formed during the cutting operation to curl and break to the extent desired. In addition, the cutting inserts of Warren and Loqvist do not provide seating areas to allow for two sided use; that is, the structures described in Warren and Loqvist are one sided cutting inserts which can not be inverted for further use when one side is worn or damaged.

The patent to Holma et al describes cutting inserts having spaced recesses which like Shirai et al, Warren and Loqvist are also useful in reducing friction and heat during the cutting operation but provide less than adequate structure for curling and breaking chips during use. In addition, the spaced recesses of Holma et al intersect the periphery of the insert at its cutting edge which tends to diminish the strength of the edge.

It is highly desirable to provide an improved disposable cutting insert for chip forming. It is also desirable to provide a disposable cutting insert for chip forming wherein if a respective chip is not curled and broken along a first chip forming surface, a second surface is provided to effect such a result. It is likewise desirable to provide such structure including successive, gently sloping chip breaking surfaces. It is also desirable to provide such a cutting insert for chip forming having a positive rake surface on the upper surface of the insert. It is further desirable to provide a disposable cutting insert for chip forming having chip forming surface areas which reduce friction and heat while forcing chips to curl and break as desired during the cutting operation. It is also desirable to provide such structure having a plurality of spaced chip forming recesses wherein the strength of the cutting edges is not reduced by the presence of such recesses. It is highly desirable to provide such structure having opposing faces including opposing seating areas which allow for two sided use of the insert; that is, to provide such an improved insert which can be inverted from a first side to a second side when the first side is worn or damaged.

SUMMARY OF THE INVENTION

This invention achieves these and other results by providing a cutting insert comprising a polygonal body having substantially parallel upper and lower surfaces including a raised seating surface having a plurality of upper surface edges, and a lower surface having a plurality of lower surface edges. A plurality of peripheral side surfaces is provided each of which extends upwardly relative to the lower surface from one of the lower surface edges to one of a plurality of first face surfaces at one of a plurality of first juncture lines, each of which forms a respective cutting edge. Each first face surface is lower than the raised seating surface. Each peripheral side surface extends towards an adjacent peripheral side surface to one of a plurality of corners. A plurality of first inner surfaces is provided each of which extends inwardly and downwardly from one of the first face surfaces at one of a plurality of second juncture lines. Each first inner surface extends at a first angle measured relative to the plane of an adjacent face surface, such first angle forming a positive rake angle. A plurality of second inner surfaces is provided each of which extends outwardly and downwardly from an upper surface edge at one of a plurality of third juncture lines. Each first inner surface meets an adjacent second inner surface at one of a plurality of fourth juncture lines. Each second inner surface extends at a second angle measured relative to the plane of the raised seating surface. A plurality of depressions is provided extending into the upper surface, a surface area of each depression intersecting a respective first inner surface, a respective second inner surface and the raised seating surface.

DESCRIPTION OF THE PREFERRED EMBODIMENT

Figure 1:
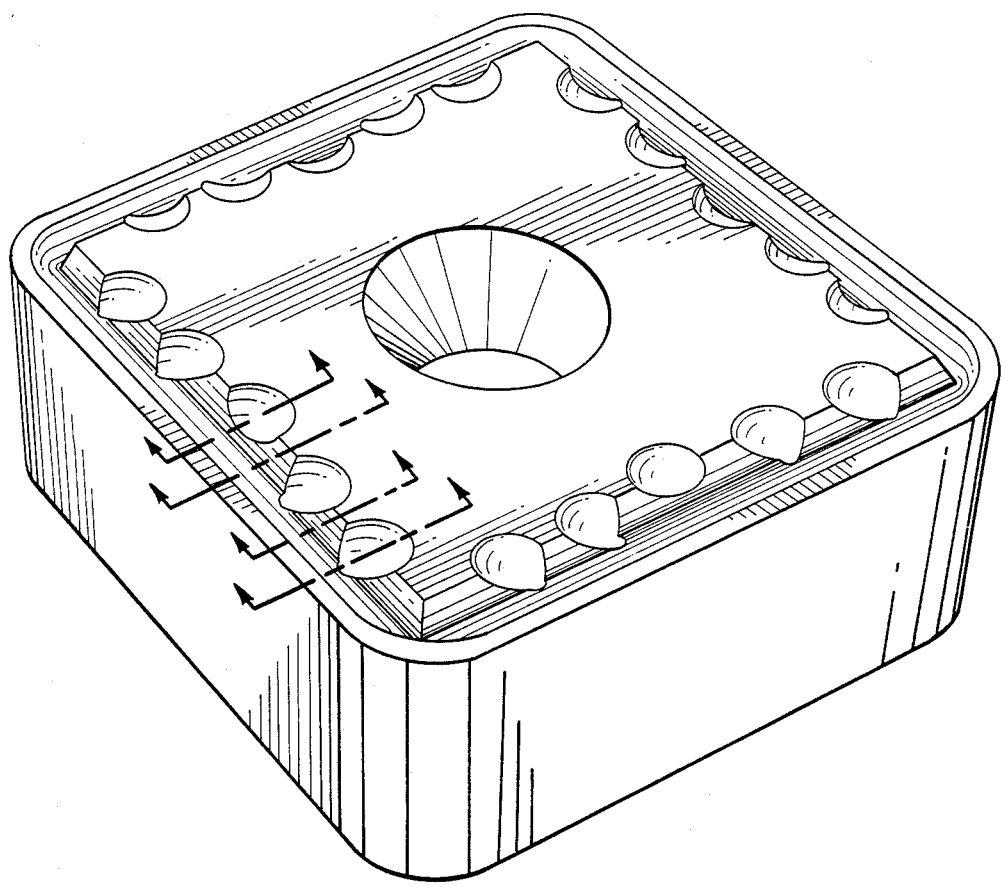
FIG. 1 is a perspective view of one embodiment of the present invention.

The embodiment which is illustrated in FIGS. 1 to 5 is particularly suited for achieving the objects of this invention. FIGS. 1 to 5 depict a cutting insert 2 comprising a polygonal body having substantially parallel upper and lower surfaces including a raised seating surface 4 and a lower surface 6. The raised seating surface 4 includes a plurality of upper surface edges 8 and the lower surface 6 includes a plurality of lower surface edges 10. A plurality of peripheral side surfaces 12 is provided, each peripheral side surface 12 extending upwardly relative to lower surface 6 from one of the lower surface edges 10 to one of a plurality of first face surfaces 14 at one of a plurality of first juncture lines 16. Seating surface 4 is raised relative to first face surfaces 14. Each juncture line 16 forms a respective cutting edge. Each of the peripheral side surfaces 12 extends towards adjacent peripheral side surfaces 12 to form one of a plurality of respective corners 18.

A plurality of first inner surfaces 20 is provided each of which extends inwardly and downwardly from one face surface 14 at one of a plurality of second juncture lines 22. A plurality of second inner surfaces 24 is provided each of which extends outwardly and downwardly from one of the plurality of upper surface edges 8 at one of a plurality of third juncture lines formed at a respective upper surface edge 8. Each first inner surface 20 meets an adjacent second inner surface 24 at one of a plurality of fourth juncture lines 26.

Each first inner surface 20 extends at a first angle 28 measured relative to the plane 30 of an adjacent face surface 14, such first angle 28 forming a positive rake angle. Each second inner surface 24 extends at a second angle 32 measured relative to the plane 34 of the raised seating surface 4. In the preferred embodiment such second angle 32 is less than thirty-six degrees.

A plurality of depressions 36 is provided extending into the upper surface of the cutting insert 2. In particular, such depressions are formed such that a surface area of each depression intersects a respective first inner surface 20, second inner surface 24 and raised seating surface 4.

Figure 6:
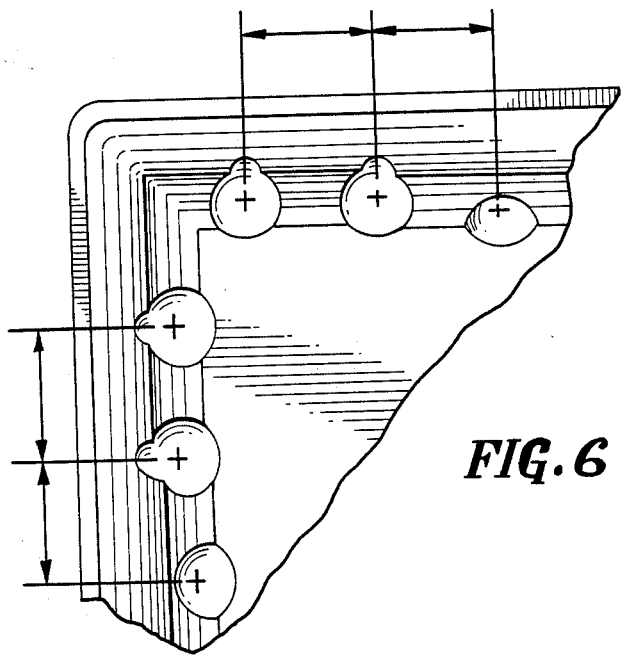
FIG. 6 is a partial top plan view of the embodiment of FIG. 1.
Figure 1A:
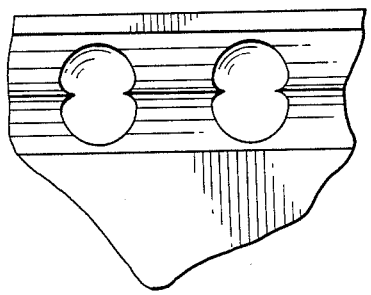
FIG. 1A is a partial top plan view of an alternative form of depressions of the present invention.
Figure 2:
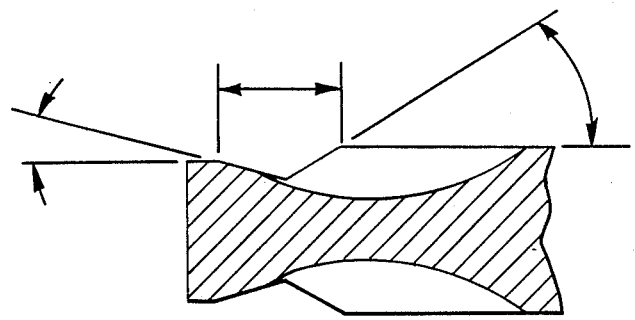
FIG. 2 is a sectional view of FIG. 1 taken along lines 2—2.
Figure 3:
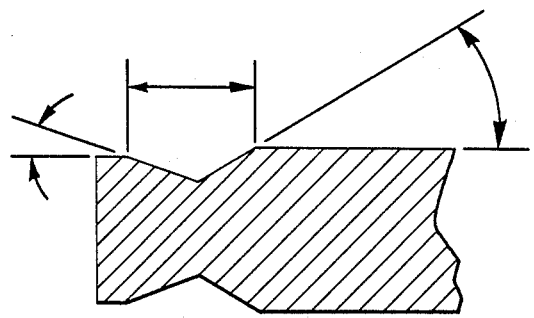
FIG. 3 is a sectional view of FIG. 1 taken along lines 3—3.
Figure 4:
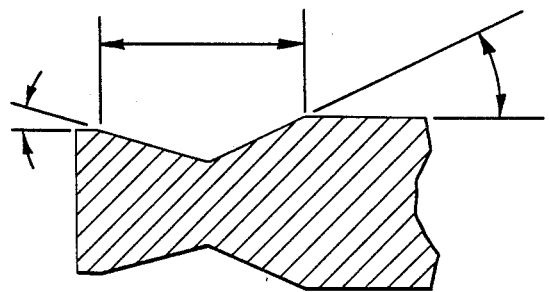
FIG. 4 is a sectional view of FIG. 1 taken along lines 4—4.
Figure 5:
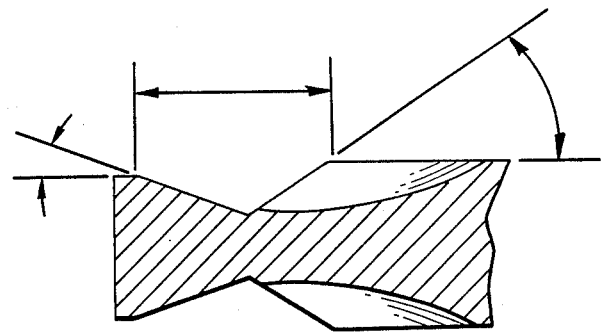
FIG. 5 is a sectional view of FIG. 1 taken along lines 5—5.
Figure 7:
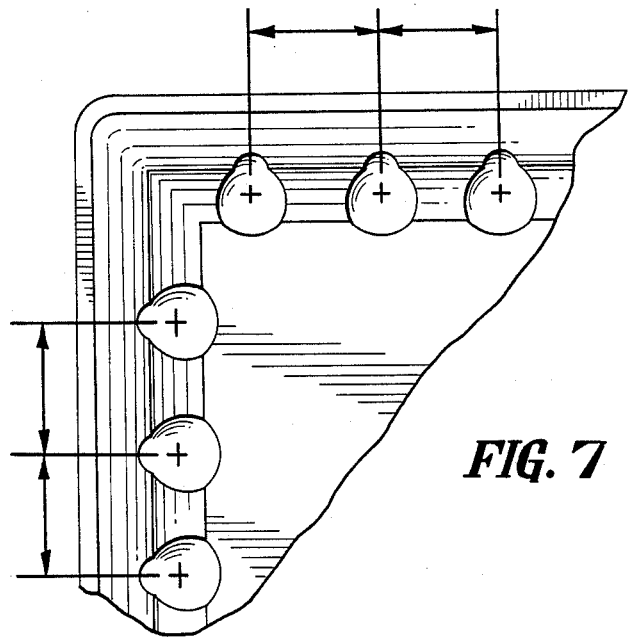
FIG. 7 is a partial top plan view of another embodiment of the present invention.

In the preferred embodiment each depression 36 has a substantially identical configuration and is positioned symmetrically relative to a respective axis which is parallel to and spaced from an adjacent cutting edge. For example, as depicted in FIG. 1 a plurality of depressions 36 is provided each depression having an identical spherical configuration although other types of configurations such as, for example, the elongated depression 36' of FIG. 1A can be provided. As depicted in FIG. 6, the distances between at least two respective axes 38, 40 of at least two respective depressions 36 and a first respective adjacent cutting edge 16, are different; that is, the distance between cutting edge 16 and axis 38 of a depression 36 is not equal to the distance between cutting edge 16 and axis 40 of an adjacent depression 36. In such embodiment, such distances are repeated with respect to respective axes such as axes 38', 40' parallel to respective other adjacent cutting edges such as cutting edge 16'. Alternatively, as depicted in FIG. 7, each depression 42 is positioned symmetrically relative to a respective axis 44 which is parallel to and spaced from an adjacent cutting edge formed at a respective juncture line 46. In the embodiment of FIG. 7, the distance between each respective axis 44 and each respective adjacent cutting edge is equal.

Although not necessary, the depressions can be equally spaced when measured in the direction of an adjacent cutting edge. For example, as depicted in FIG. 6 the depressions 36 are equally spaced as designated at 48 when measured in the direction of a respective adjacent cutting edge represents at 16, 16'. Alternatively, depressions 42 of FIG. 7 are spaced such that center-to-center distance 50 is greater than center-to-center distance 52, measured in the direction of a respective cutting edge. Regardless of the spacing and positioning of the depressions, the distance between respective second and third juncture lines, as for example, at 54, 56, 58 and 60 of FIGS. 2 to 5 will be less than the diameter of a depression 36.

The insert 2 includes a central opening 54 extending therethrough to facilitate positioning the insert 2 in a tool holder. The opening 54 provides a means whereby a mating member can be fitted within the opening to secure the insert to the work holder. It is also possible to use a center post and washernut combination to hold the insert in place in addition to several other well known securing devices. Preferably, the lower surface of the insert is identical to the upper surface of the insert so that the insert can be inverted from a first side to a second side when the first side is worn or damaged. To this end the lower surface will include a raised seating surface 4' similar to the raised seating surface 4 of the upper surface of the insert 2 as depicted in FIGS. 2 to 5. In this manner, the insert will include opposing seating areas which allow for two sided use of the insert in a known manner.

The embodiments described herein provide an improved cutting insert for chip forming. The insert of the present invention includes a plurality of spaced chip forming recesses or depressions such as, for example, the depressions 36 of FIG. 1, such depressions being spaced from the periphery of the insert at its cutting edge. In this manner, structure is provided wherein the strength of the cutting edges is not reduced by the presence of depressions since such depressions do not intersect the periphery of the insert. In the area between the depressions discrete shoulders are provided as at, for example, surfaces 24, to insure chip curling and breaking. In this manner, the second inner surfaces 24 and spaced depressions 36 form respective first chip forming surfaces and second chip forming surfaces. In such structure, if a respective chip is not curled and broken along a first chip forming surface, a second surface is provided to effect such a result. By way of example, and referring to FIG. 6, second surfaces 24 form such first chip forming surfaces and the back end generally designated 36" of the depressions 36 form such second chip forming surfaces. Surfaces 24 and 36" provide successive, gently sloping chip breaking surfaces or areas which allow for reduction of friction and heat and the curling and breaking of chips as desired during the cutting operation. Such an insert can be provided having a positive rake surface 20 on the upper surface of the insert.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A cutting insert comprising a polygonal body having substantially parallel upper and lower surfaces including a raised seating surface having a plurality of upper surface edges, and a lower surface having a plurality of lower surface edges, a plurality of peripheral side surfaces each of which extends upwardly relative to said lower surface from one of said lower surface edges to one of a plurality of first face surfaces at one of plurality of first juncture lines each of which forms a respective cutting edge, each first face surface of said plurality of first face surfaces being lower than said raised seating surface, each of said peripheral side surfaces extending towards adjacent peripheral side surfaces to form one of a plurality of respective corners, a plurality of first inner surfaces each of which extends inwardly and downwardly from one face surface of said plurality of first face surfaces at one of a plurality of second juncture lines, each first inner surface of said plurality of first inner surfaces extending at a first angle measured relative to the plane of an adjacent face surface, said first angle forming a positive rake angle, a plurality of second inner surface each of which extends outwardly and downwardly from one of said plurality of upper surface edges at one of a plurality of third juncture lines, each first inner surface of said plurality of first inner surfaces meeting an adjacent second inner surface of said plurality of second inner surfaces at one of a plurality of fourth juncture lines, each second inner surface of said plurality of second inner surfaces extending at a second angle measured relative to the plane of said raised seating surface, and a plurality of depressions extending into said upper surface, a surface area of each depression of said plurality of depressions only intersecting a respective first inner surface of said plurality of first inner surfaces, a respective second inner surface of said plurality of second inner surfaces, and said raised seating surface.

2. The cutting insert of claim 1 wherein each depression of said plurality of depressions has a substantially identical configuration and is positioned symmetrically relative to a respective axis which is parallel to and spaced from an adjacent cutting edge.

3. The cutting insert of claim 2 wherein each depression is spherical.

4. The cutting insert of claim 3 wherein the distance between each respective axis and each respective adjacent cutting edge is equal.

5. The cutting insert of claim 4 wherein the depressions of said plurality of depressions are equally spaced when measured in the direction of an adjacent cutting edge.

6. The cutting insert of claim 3 wherein the distances between at least two respective axes, which are parallel to and spaced from a first respective adjacent cutting edge, of at least two respective depressions, and said first respective adjacent cutting edge are different, said distances being repeated with respect to respective two axes parallel to respective other adjacent cutting edges.

7. The cutting insert of claim 6 wherein the depressions of said plurality of depressions are equally spaced when measured in the direction of an adjacent cutting edge.

8. The cutting insert of claim 2 wherein each depression is elongated.

9. The cutting insert of claim 8 wherein the distance between each respective axis and each respective adjacent cutting edge is equal.

10. The cutting insert of claim 2 wherein the distances between at least two respective axes, which are parallel to and spaced from a first respective adjacent cutting edge, of at least two respective depressions, and said first respective adjacent cutting edge are different, said distances being repeated with respect to respective two axes parallel to respective other adjacent cutting edges.

11. A cutting insert comprising a polygonal body having substantially parallel upper and lower surfaces including a raised seating surface having a plurality of upper surface edges, and a lower surface having a plurality of lower surface edges, a plurality of peripheral side surfaces each of which extends upwardly relative to said lower surface from one of said lower surface edges to one of a plurality of first face surfaces at one of plurality of first juncture lines each of which forms a respective cutting edge, each first face surface of said plurality of first face surfaces being lower than said raised seating surface, each of said peripheral side surfaces extending towards adjacent peripheral side surfaces to one of a plurality of corners, a plurality of first inner surfaces each of which extends inwardly and downwardly from one of said plurality of first face surfaces at one of a plurality of second juncture lines, each first inner surface of said plurality of first inner surfaces extending at a first angle measured relative to the plane of an adjacent face surface, said first angle forming a positive rake angle, a plurality of second inner surfaces each of which extend outwardly and downwardly from one of said plurality of upper surface edges at one of a plurality of third juncture lines, each first inner surface of said plurality of first inner surfaces meeting an adjacent second inner surface of said plurality of second inner surfaces at one of a plurality of fourth juncture lines, each second inner surface of said plurality of second inner surfaces extending at a second angle measured relative to the plane of said raised seating surface, said second angle being less than thirty-six degrees, and a plurality of depressions extending into said upper surface, a surface area of each depression of said plurality of depressions only intersecting a respective first inner surface of said plurality of first inner surfaces, a respective second inner surface of said plurality of second inner surfaces and said raised seating surface, each depression of said plurality of depressions being substantially identical in configuration and being positioned symmetrically relative to a respective axis which is parallel to and spaced from an adjacent cutting edge.

* * * * *